May 3, 1932.  A. FEIGELSON  1,856,866
VEHICLE WHEEL ATTACHMENT
Filed Dec. 10, 1928
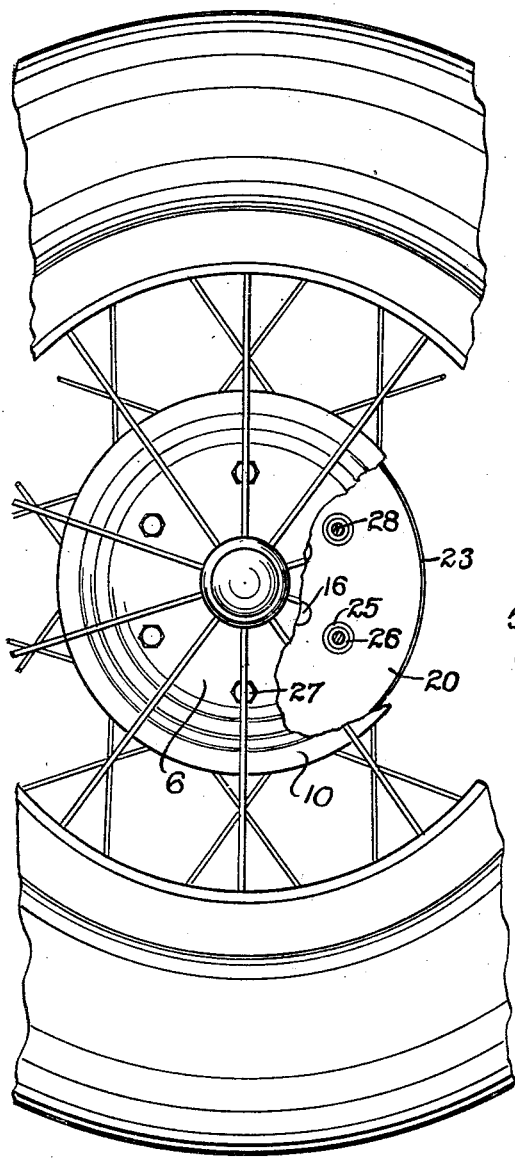
Fig.2.
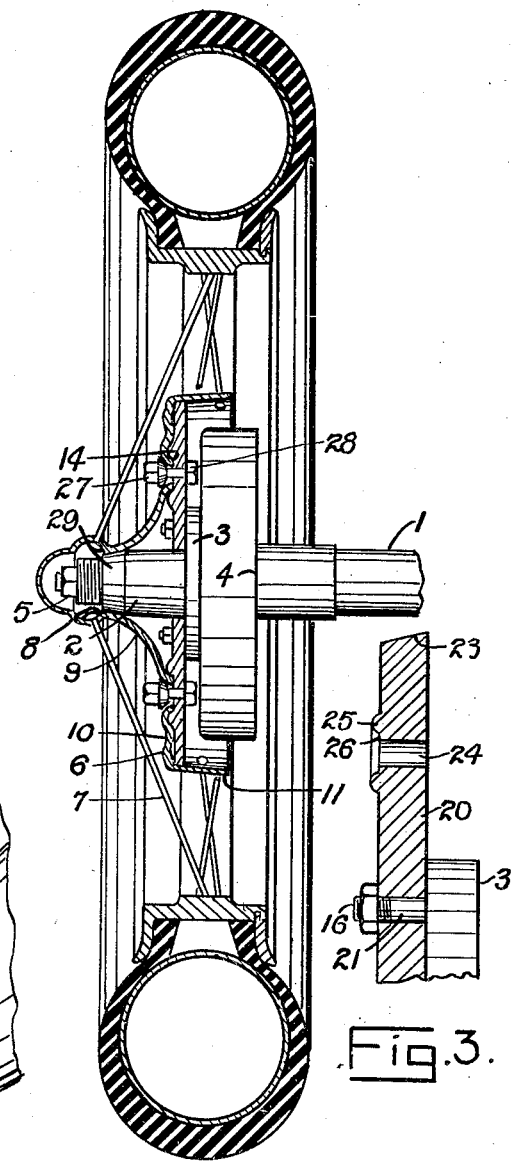
Fig.3.
Fig.1.
Alexander Feigelson  Inventor
By  Jesse R. Stone
Attorney Patented May 3, 1932

1,856,866

UNITED STATES PATENT OFFICE

ALEXANDER FEIGELSON, OF BEAUMONT, TEXAS

VEHICLE WHEEL ATTACHMENT

Application filed December 10, 1928. Serial No. 324,879.

My invention relates to an improvement in the construction of vehicle wheels whereby various types of wheels may be adapted for use upon existing hub constructions.

My invention is particularly adapted for reforming a vehicle wheel hub in such a manner that I may utilize an old or used hub in connection with various types of wheels and is of particular advantage in applying a wheel for use upon trailers.

It is important in trailer construction that the wheels to be used upon the trailer be identical with the wheels which are used upon the truck or power vehicle, in order that a single spare wheel will have to be carried. The trailers now in general use have specially constructed wheels and axles, but it is one of the objects of my invention to provide an attachment whereby the usual wheel hub may be adapted to receive the wheels which are in general use upon trucks and other motor vehicles.

Another object of my invention is to provide a collar or adapter to be carried by the hub construction, and which is of such a diameter as to receive the wheel.

Still another object of my invention is to provide the improved collar with a series of openings, each of which is surrounded by an upstanding rib which will aid in centering the wheel when it is attached to the hub.

Other and further advantages of my improved construction will be readily apparent when the following description is considered in connection with the accompanying drawings, wherein:

Fig. 1 is a central vertical section of a vehicle wheel hub and axle showing the application of my invention thereto.

Fig. 2 is a side elevation of a wheel, a portion of which is broken away to show my improved construction.

Fig. 3 is an enlarged detailed section of my improved adapter showing the means by which it is attached to the hub of the wheel.

The reference character 1 indicates an axle such as is ordinarily used in trailer construction. This axle is adapted to receive a hub 2, which is of ordinary construction and has the usual roller or ball bearings disposed therein. These have not been shown in section, as their construction is well known. The hub 2 carries a flange 3 and a brakedrum 4, and in the usual wooden vehicle wheel the spokes are attached to this flange 3. In order to adapt this hub to may construction, the wooden spokes and an outer flange have been removed, leaving the hub 2 and the flange 3, also the brakedrum 4. This hub is placed upon the axle 1 and is retained in place by the usual nut 5.

The vehicle wheels as used on a majority of the trucks now in general use are constucted with wire spokes instead of the wooden spokes heretofore in use. With the wire spoke construction the wheel is adapted to be removed from the hub, and the hub left intact upon the vehicle axle. A hub shell 6 serves as a center from which the wire spokes 7 radiate. This hub shell and housing 6 is of considerably larger diameter than the hub 2 formerly used with the wooden wheels. This hub shell 6 is somewhat conical in formation and has the contact 8 near its apex, from which it flares outwardly as at 9, to form a flat portion 10 which terminates in a flange 11. The flat portion 10 has a plurality of openings therein, each of which is surrounded by a ridge 14.

The flange 3 has a plurality of openings therein from which bolts 16 project. These bolts 16 originally retained the wooden spokes of the old wheel. I have constructed a disc or collar 20, which has a central opening of sufficient diameter to snugly fit upon the hub 2. A plurality of openings 21 are circumferentially disposed in the disc 20, so that they will register with the bolts 16 of the flange 3. In this manner I am enabled to attach the disc 20 securely to the flange 3.

The disc or plate 20 is of sufficient diameter to fit within the flange 11 of the housing or hub shell 6, and is adapted to contact the straight portion 10 thereof. The plate 20 is preferably tapered slightly at its periphery 23 so that it will securely engage the flange 11. A plurality of openings 24 are also circumferentially disposed in the plate 20 and adapted to register with the openings in the straight portion 10 of the hub plate. Each of these openings 24 is surrounded by a rim 25 slightly spaced from the opening to form a shoulder 26. When the disc 20 and the hub shell 6 are in an assembled position, the ridge 14 seats inside the shoulder 26 forming a positive centering means for the wheel with respect to the hub.

The hub 2 here shown is that of a rear wheel, but it is to be understood that any desirable hub may be used in combination with my adapter plate.

The contact portion 8 is adapted to seat upon a tapered portion 29 of the hub 2 so that a centrally disposed supporting action is obtained for the wheel with respect to the hub. This tapered portion 29 exists on some of the old wheels, or I may form it by slightly grinding away the outer end of the hub 2.

The nuts 27 are adapted to fit upon bolts 28 which pass through the openings 24, and by this means I am enabled to securely clamp the hub shell 6 to the disc 20.

It will be apparent from the foregoing description that I have provided a means of attaching vehicle wheels to existing hub constructions in a simplified manner, and at a very slight expense, as it is a very economical operation to fabricate the disc 20 and to remodel the hub 2 in such a manner that it may receive the hub shell 6. My improvement while very simple results in a material saving to the trade in purchasing trailers, inasmuch as it eliminates the special construction of a hub and wheel and the inconvenience of carrying a spare wheel for the trailer in addition to the spare wheel which is usually carried for the truck.

While I have shown an embodiment of the invention which I believe to be entirely practical and satisfactory for the purpose in view, nevertheless it is to be understood that the device may be constructed in various other alternative forms to adapt itself to the multitude of existing wheel constructions, and it is accordingly to be understood that in the further development of the device that I reserve the privilege of resorting to all such legitimate changes therein as may be fairly embodied within the spirit and scope of the invention as claimed.

Having described my invention, what I desire to secure by Letters Patent is:

The combination of a vehicle wheel hub, a vehicle wheel, and an adapter plate, a tapered portion on said plate to receive and support a portion of a wheel hub shell, means for attaching said adapter plate to said hub, said adapter plate being of larger diameter than said hub, means for registering said hub shell upon said adapter plate, means for centering the said wheel upon said adapter plate, and means to secure said wheel in registered position.

In testimony whereof I hereunto affix my signature this 3rd day of December, A. D. 1928.

ALEXANDER FEIGELSON.